J. K. RUSH.
ARTIFICIAL BAIT.
APPLICATION FILED JAN. 12, 1918.
1,332,306.
Patented Mar. 2, 1920.
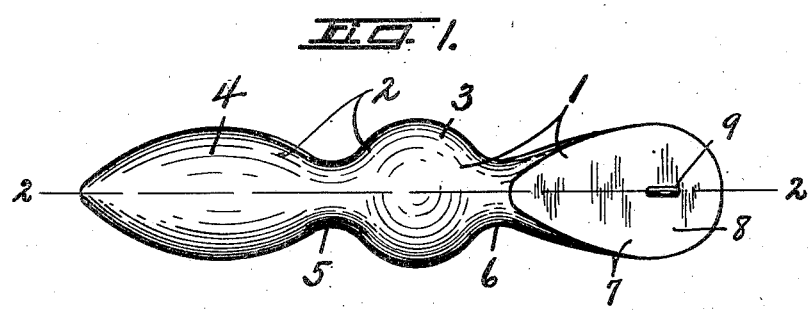
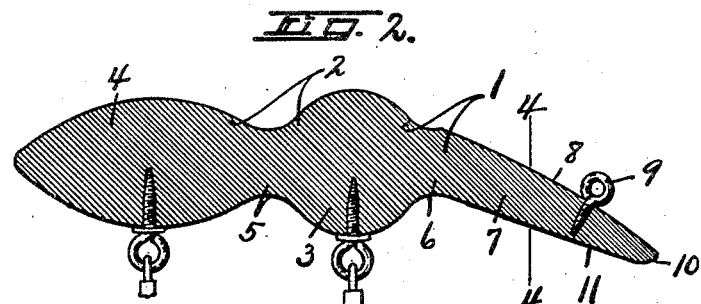
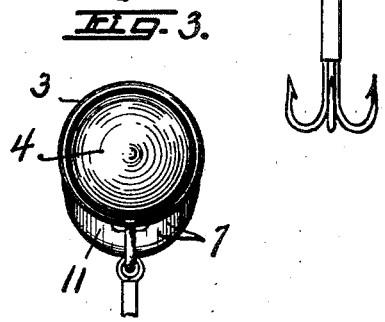
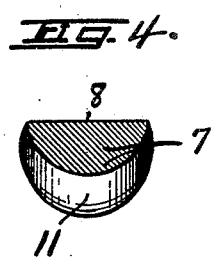
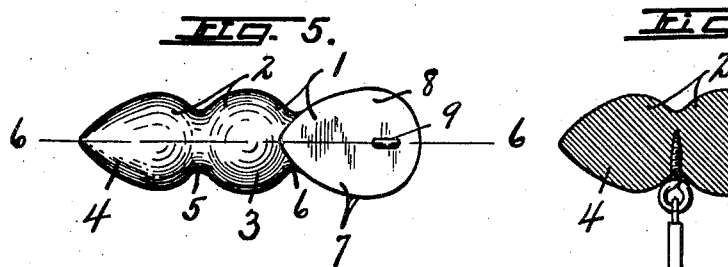
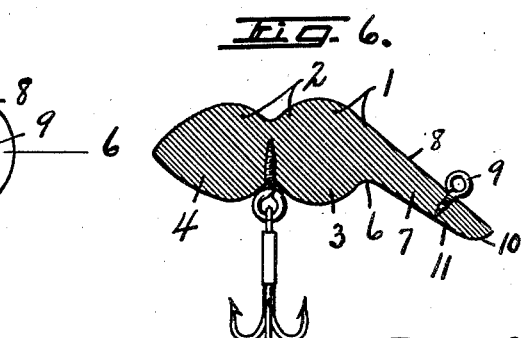
INVENTOR
Joseph K. Rush
BY
Dennison Thompson
ATTORNEY.

UNITED STATES PATENT OFFICE.

JOSEPH K. RUSH, OF SYRACUSE, NEW YORK.

ARTIFICIAL BAIT.

1,332,306.         Specification of Letters Patent.     Patented Mar. 2, 1920.

Application filed January 12, 1918. Serial No. 211,545.

*To all whom it may concern:*

Be it known that I, JOSEPH K. RUSH, a citizen of the United States of America, and resident of Syracuse, in the county of Onondaga, in the State of New York, have invented new and useful Improvements in Artificial Bait, of which the following, taken in connection with the accompanying drawings, is a full, clear, and exact description.

This invention relates to certain improvements in artifical bait of the character adapted for trolling and casting.

The primary object of the invention is to produce a bait of this character of less specific gravity than water, so that it will normally float upon the surface of the water and so shaped and balanced that if reeled slowly it will constitute a surface bait, and if reeled more rapidly, an under water bait, its submergence and the depth at which it travels being determined by the speed of movement of the bait relatively to the water, the bait under all conditions, whether used as a surface or an under water bait, having a reciprocal wriggling, zig-zag, movement imitating the action of a fish in swimming.

Heretofore, under water bait of the type illustrated in Yakeley Design Patent No. 46,794, issued December 22, 1914, have been formed with a longitudinal cigar-shaped body having its greatest diameter at substantially the central portion of the body and tapering therefrom in opposite directions, so that the bait moves about its greatest horizontal diameter as a pivot axis and when lying in water normally inclines downwardly at an angle of approximately 45 degrees.

When such a bait is reeled in it dives to a considerable depth and is solely an under water bait.

The structure here shown, operates in a markedly different manner from the commercial bait described, by reason of the fact that the body of the bait is formed of two bulbous portions arranged end to end and separated by a contracted waist portion, so that the smallest diameter of the bait body is at an intermediate portion of such body and preferably near the center thereof. Such a bait is found to normally lie substantially flat or in a horizontal plane upon the surface of the water and does not dive when reeled in slowly, and is therefore of great value for use both in deep water and in shallow places, particularly where the bottom is covered with grass or the like, the operator readily effecting such movement of the bait as will constitute it, either a surface bait or an under water bait, traveling at a desired depth.

Other objects and advantages of the invention relate to the details of form and arrangement of the parts as will more fully appear from the following description taken in connection with the accompanying drawings in which—

Figure 1 is a top plan view of a bait of my invention.

Fig. 2 is a cross section on —2—2— Fig. 1.

Fig. 3 is an elevation of the bait from the rear.

Fig. 4 is a cross section on —4—4— Fig. 2.

Fig. 5 is a top plan of a slightly modified form used in making small baits.

Fig. 6 is a cross section on —6—6— Fig. 5.

The invention comprises a plug —1— formed preferably of wood or other material of a specific gravity less than water, so that the plug carrying suitable hooks will normally float upon the surface of the water. The plug may be and preferably is turned or otherwise shaped from a single piece of material, and in finished form comprises a body portion —2— formed of a pair of bulbous parts, —3— and —4— respectively, connected end to end by a contracted waist —5— into which both bulbous portions symmetrically merge. Preferably the body, throughout its length, is circular in cross section, all circumferences of the body being co-axial. The two bulbous parts are preferably shaped as shown in the figures of the drawing, the forward part —3— being substantially spherical in form, while the rear part —4— is elongated and substantially ellipsoidal in form and tapers to a substantial point at the rear. Preferably the greatest diameter of the part —3— is slightly longer than the greatest diameter of the part —4—.

The cylindrical part —3— merges at its forward end into a contracted circular neck —6— which neck in turn merges into a bulbous head —7— having an upper forwardly and downwardly inclined substantially plane surface —8— adapted to lower the bait when drawn at a sufficiently rapid rate through the water. Line attaching means may be provided as screw-eye —9— secured upon the forwardly and downwardly inclined face —8—, and preferably as shown this eye is positioned below the longitudinal axis of the body —2—, although it will be apparent that the line attaching means may be secured to the bait at different points thereon, and if positioned upon the face —8— may be secured in any desired position thereon to effect proper submergence of the bait at predetermined speed of movement through the water.

The surface —8— may, as shown, be substantially pear-shaped with its narrower upper end terminating as shown in Fig. 1, just in front of the contracted neck —6— or this surface may, as shown in Fig. 5, be converged to a substantial point lying in the circumference of the neck —6—.

The head —7— is provided with a laterally arcuate downwardly and rearwardly inclined front wall —10— merging symmetrically into the upwardly inclined laterally arcuate lower surface —11— of the head.

It will be noted that both the upper and lower surfaces of the head —7— are rearwardly and upwardly inclined and merge into the contracted neck, although the upper surface —8— may terminate slightly in front of said neck and the circumference of the neck being preferably, as shown, concentric with any selected circumference of the binary bulbous body —2—.

Preferably the head —7— as shown extends some distance below the plane of the lower surface of body —2—. This construction being quite accentuated in the bait shown in Fig. 6. The body —2— carries suitable hooks and as shown in Figs. 2 and 3 a suitable hook or hooks may be secured to each bulbous body, while in the structure shown in Fig. 6 the hook is secured at the contracted waist portion —5—. The latter structure is particularly adapted for use with small bait carrying a single hook or a plurality of hooks mounted upon a single attaching means.

Although I have shown and described specific constructions as illustrative of my invention, and as perhaps preferred embodiments thereof, I do not desire to limit myself to the exact details of construction, form and arrangements as variations may be made in each of the same without departing from the spirit of this invention as set forth in the appended claims.

I claim:—

1. An artificial bait comprising a rigid, binary bulbous body, and a head extending forwardly from the body and rigidly connected thereto.

2. An artificial bait comprising three bulbous bodies rigidly connected end to end by contracted portions.

3. An artificial bait comprising a body formed of two bulbous parts connected end to end by a contracted waist portion into which both of said parts symmetrically merge and a head extending forwardly and downwardly from the body and separated therefrom by a contracted neck.

4. An artificial bait comprising a body, formed of two bulbous parts connected end to end by a contracted waist portion into which both said parts symmetrically merge, and a head extending forwardly from the body and separated therefrom by a contracted neck.

5. An artificial bait comprising a rigid binary bulbous body, a head extending forwardly from the body and having a forwardly and downwardly inclined plane face for inducing submergence of the bait, and a contracted neck intermediate the head and body.

6. An artificial bait formed of one integral piece of material of less specific gravity than water and comprising three bulbous bodies connected end to end, the front one of said bodies having at its forward end a surface opposed to the forward movement of the bait through the water.

7. An artificial bait formed of one integral piece of material of less specific gravity than water and comprising three bulbous bodies connected end to end, the front one of said bodies having at its forward end a surface inducing submergence of the bait when the latter is drawn rapidly through the water.

8. An artificial bait comprising a body formed of two bulbous portions rigidly united by a contracted waist portion, said bulbous portions being so formed and related to each other as to normally cause the bait to lie substantially parallel with the surface of the water when moving at slow speeds relatively to the water and permitting diving of the bait when tension is applied to the line causing the bait to move at higher speeds relatively to the water, a head extending forwardly from the body and provided with a forwardly downwardly inclining resistance surface of substantial area adapted to induce submergence of the bait at said higher speeds and a contracted neck intermediate the head and body.

In witness whereof I have hereunto set my hand this 5th day of January, 1918.

JOSEPH K. RUSH.

Witnesses:
E. A. THOMPSON,
H. E. CHASE.